United States Patent
Fernandez et al.

(10) Patent No.: US 6,260,646 B1
(45) Date of Patent: Jul. 17, 2001

(54) POWER-ASSISTED PALLET TRUCK

(76) Inventors: Raul U. Fernandez, 1790 Lakeshore Cir., Weston, FL (US) 33326; Daniel C. Mullock, 2678 Royalwoods Ct., Cincinnati, OH (US) 45244

(*) Notice: Subject to any disclaimer, the term of this patent is extended or adjusted under 35 U.S.C. 154(b) by 0 days.

(21) Appl. No.: 09/302,131

(22) Filed: Apr. 29, 1999

(51) Int. Cl.$^7$ ...................................................... B60K 1/00
(52) U.S. Cl. ................. 180/65.6; 280/43.12; 280/43.23; 280/766.1; 180/12; 180/65
(58) Field of Search ................. 180/65.6, 65; 280/43.12, 280/43.23, 109

(56) References Cited

U.S. PATENT DOCUMENTS

| | | | |
|---|---|---|---|
| 2,469,638 | * 5/1949 | Framhein | 280/43.12 |
| 2,592,091 | * 4/1952 | Weaver | 280/43.12 |
| 2,601,171 | * 6/1952 | Schreck | 280/43.12 |
| 3,249,170 | * 5/1966 | Qualye | 280/43.12 |
| 3,261,617 | * 7/1966 | Becker et al. | 280/43.12 X |
| 3,295,881 | * 1/1967 | Worthington | 280/43.12 X |
| 3,701,211 | * 10/1972 | Best | 280/43.12 |
| 3,982,767 | 9/1976 | Larsson et al. | |
| 4,047,698 | * 9/1977 | Ellis | 280/43.12 X |
| 4,065,012 | * 12/1977 | Rocco | 280/43.12 |
| 4,103,795 | * 8/1978 | Miller | 280/43.12 X |
| 4,287,959 | * 9/1981 | Inman | 280/43.12 |
| 4,589,669 | 5/1986 | Kedem . | |
| 4,615,533 | * 10/1986 | Sewell | 280/43.12 |
| 4,997,195 | * 3/1991 | Lee | 280/43.12 |
| 5,113,960 | * 5/1992 | Prinz | 280/43.12 |
| 5,245,144 | 9/1993 | Stammen . | |

FOREIGN PATENT DOCUMENTS

| | | | |
|---|---|---|---|
| 0601850 | * 8/1934 | (DE) | 180/65.6 |
| 3322804 | * 1/1985 | (DE) | 180/65.6 |

* cited by examiner

*Primary Examiner*—Lanna Mai
*Assistant Examiner*—Toan To
(74) *Attorney, Agent, or Firm*—Robert H. Frantz (57) ABSTRACT

A pallet truck for manually transporting loaded pallets is provided with a momentary locomotion means that assists an operator in starting a load moving from a state of rest. The locomotion subsystem is of suitable weight and size to allow the power-assisted pallet truck to be manually operated, and to allow for use of the pallet truck in similar space constraints as manual pallet trucks. In an enhanced embodiment, a governor switch is provided which disables the power-assistance after the load has been accelerated to walking speed in order to protect the motor from use as a full-time locomotion means.

13 Claims, 7 Drawing Sheets

POWER-ASSISTED PALLET TRUCK

TECHNICAL FIELD OF THE INVENTION

This invention pertains to the field of pallet trucks and lifts which are manually operable. In particular, this invention relates to pallet trucks which enable the operator to move larger loads in tight or constricted quarters.

BACKGROUND OF THE INVENTION

Pallet trucks are used widely in industry for moving heavy loads on pallets within warehouses and showrooms. Pallet trucks are more compact alternatives to using a forklift, but also require that the load to be moved must stay over a relatively level and smooth surface, as pallet trucks generally do not provide lift from the ground of more than a few inches and do not have suitable stability for moving loads up or down significant inclines.

It is well known within mechanical engineering and physical science that all objects, even those with wheels or casters, have inertia which causes them to remain either at rest or at a stable velocity. In order to start a loaded pallet truck moving from rest, the rest inertia must be overcome by applying an accelerating force to the loaded pallet truck. After the load and truck have been accelerated to a desired speed or velocity, typically walking speed such as 1 or 2 miles per hour, the force needed to sustain that speed is much less than the force which was needed to accelerate the load.

Previous US patents in this field have described methods for moving pallets using manually propelled pallet trucks of various designs, such as 3,982,767 Larsson, et al, 1976, and 4,589,669 Kedem, 1986, for hand-operated pallet trucks having a steerable groundwheels. Typical manual pallet trucks weigh between 180 and 215 pounds. Manual pallet trucks are widely-used for moving pallets however their utility declines as pallet load weights increase and/or transit surfaces become less uniform. This is because it becomes difficult for humans of normal strength to easily overcome the inertia generated by heavy loads at rest, particularly when at rest on rough or uneven surfaces. The force required to manually overcome this inertia can often lead to workplace injuries or fatigue and low productivity. However, many loads which are difficult to accelerate to walking speed are easily sustained at walking speed by a single human operator.

Fully self-propelled pallet trucks such as those described in 4,287,959 Inman, 1981, and 5,245,144 Stammen, 1993, eliminate these concerns by providing a motor means to accelerate the load and sustain its velocity. However, these self-propelled pallet trucks rely on full-time electric propulsion systems which are much heavier, much larger and are significantly more costly to purchase and maintain than the manual variety of pallet trucks. Additionally, self-propelled pallet trucks weigh between 1100 and 1300 pounds, making them useless if the batteries or fuel cell is discharged because a single person is unable to accelerate the loaded truck and sustain its speed. Hence, self-propelled pallet trucks are not as widely used as manual pallet trucks, and are not suitable for applications where maneuvering space is tight.

Therefore, there is a need in the art for a power-assisted pallet truck that minimizes the required operator effort to overcome the inertia of a load at rest, reduces operator fatigue, maintains operator productivity, and reduces injuries to the operator.

There further exists a need in the art for a power-assisted pallet truck which is similar in cost to manufacture and distribute as common manual pallet trucks already on the market, in order to make the product more widely accepted and increase its impact on the reduction of operator injuries.

Additionally, there exists a need in the art for a power-assisted pallet truck of similar weight and maneuverability to manual pallet trucks, such that it can be towed at speed under operator effort, and it can be used in a manual mode when the energy storage cell is discharged.

Finally, there exists a need in the art for a power-assisted pallet truck whose power source is suitable for indoor use, and does not produce toxic fumes or heat. The power source should be quickly rechargeable using common technology found in large warehouse environments.

SUMMARY OF THE INVENTION

The present invention, a power-assisted pallet truck, provides a locomotion means to assist the operator only to overcome the initial rest inertia, while the operator provides the energy and force to sustain the load at speed. The power-assisted pallet truck converts stored energy to mechanical energy using a motor and energy storage means which does not significantly add to the weight or size of a standard, manual pallet truck.

A preferred embodiment using low-weight electric batteries and an electric motor system is disclosed. An alternate embodiment which employs a tank of compressed gas for the energy storage means, and a means for converting released compressed gas to a load accelerating force under operator control, is also disclosed.

An object of the invention is to allow inexpensive construction of the pallet truck, as well as providing a lightweight system which can be manually operated. Because the power-assisted pallet truck only requires a means for locomotion sufficient to overcome the rest inertia, the energy storage means and motor means can be much smaller, lighter, and less expensive than the means employed on a fully self-propelled pallet truck. This addresses the higher weight and cost of self-propelled pallet trucks, and simultaneously meets objectives of the invention to reduce the problems associated with the manual pallet jacks such as injury and lower productivity.

Another object of the invention is to allow maneuvering of pallets in constrained spaces. The size of the power-assisted pallet truck is similar to the size of a manual pallet truck, making it suitable for use in spaces where maneuvering room is restricted, such as elevators, which also meets an objective of the invention.

Yet another object of the invention is for the power-assisted pallet truck to assist the operator in overcoming minor differences in floor height, such as is found between rooms in warehouses, and to assist in the movement across gaps in the floor, such as the gap between an elevator threshold and a warehouse floor. The power-assistance is also useful when moving the loaded pallet truck up a slight incline, such as the ramp between a truck bed and a loading dock.

Finally, since the power-assisted pallet truck is not significantly heavier than a standard manual pallet truck, it can be used by a single operator even when the energy storage device is fully discharged, thereby satisfying another object of the invention.

BRIEF DESCRIPTION OF THE DRAWINGS

The figures presented herein, taken in conjunction with the disclosure, form a complete description of the invention.

FIG. 4 is a frontal cut-away view of the gas-powered actuator and steering wheel assembly, while

DETAILED DESCRIPTION OF THE INVENTION

The power-assisted pallet truck consists of a traditional, manual pallet truck with the addition of a low-weight energy storage and motor means. In the preferred embodiment, the energy storage means is an electric battery, and the motor means is an electric motor. An alternate embodiment using compressed gas is also disclosed.

Figure 1:
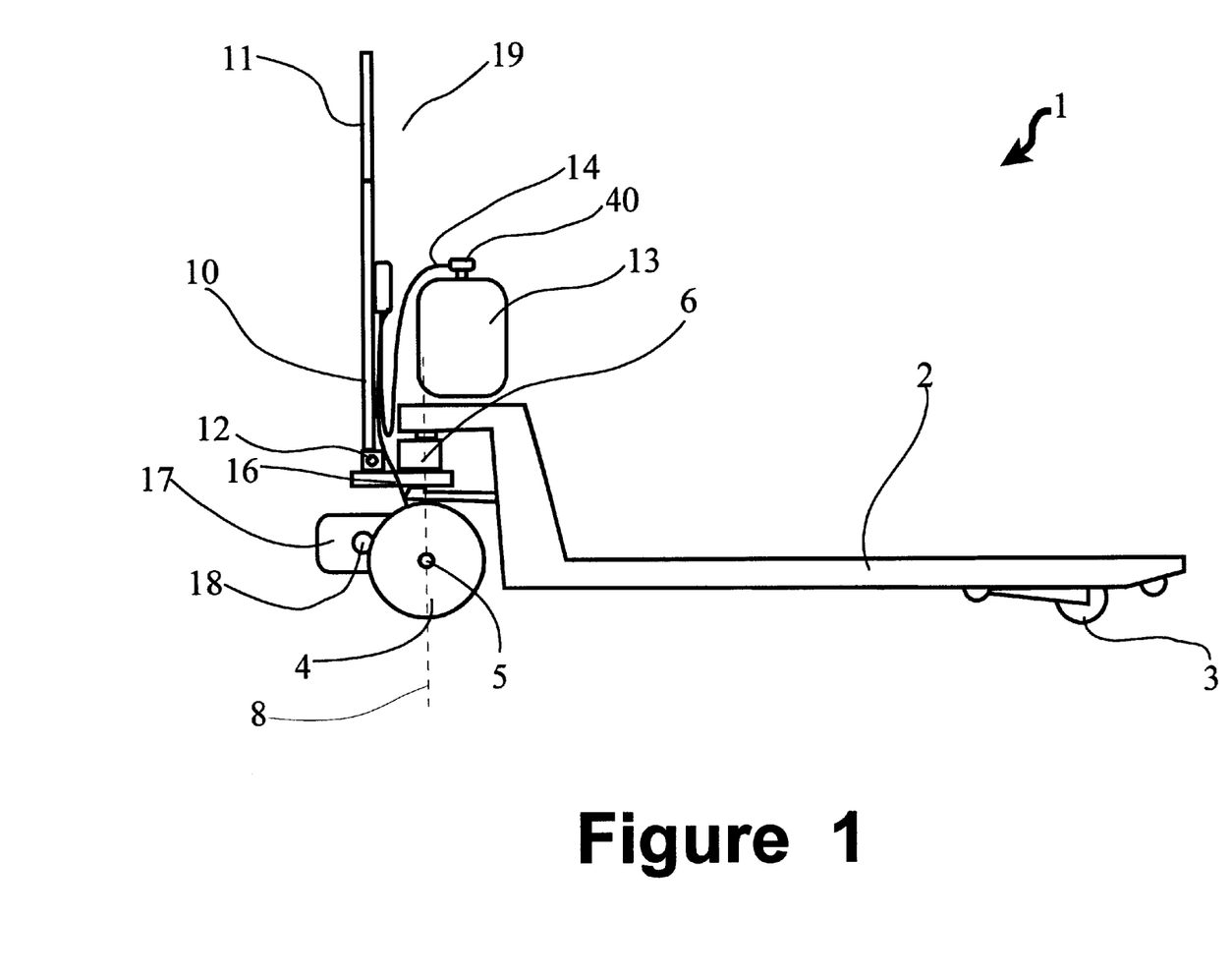
FIG. 1 depicts the side view of the power-assisted pallet truck, showing the general location of the compressed gas storage tank relative to the load bed and the steering wheels.

Turning to FIG. 1, the basic power-assisted pallet truck (1) is provided with two support wheels (3) located at the end of two lift fork tines (2). The truck (2) also has a hydraulic lift jack (6) and lift mechanism (7) to lift a load after the lift fork tines (2) have been placed under the load pallet. The hydraulic lift jack (6) and lift mechanism (7) are well known within the art.

The truck (1) is also provided with a pair of steering wheels (4) mounted on axles (5). In the preferred embodiment, these are common 6-inch wheels, and the axles (5) are positioned along a vertical axis (8) with the pivot point of the load bed with the steering wheel assembly.

Figure 6:
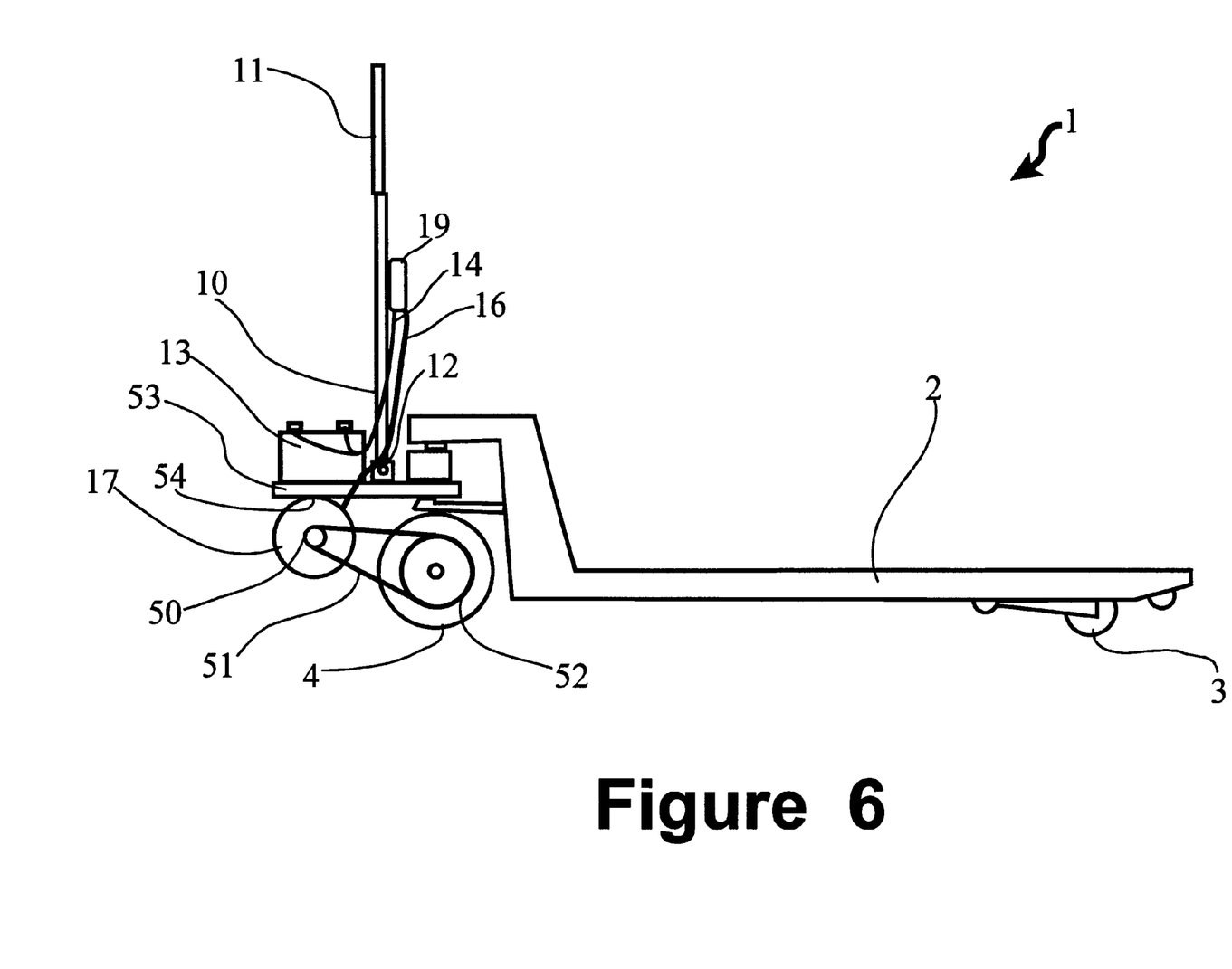
FIG. 6 discloses in more detail an electro-mechanical embodiment of the power-assisted pallet truck.

In the preferred electro-mechanical embodiment, the motor means (17) is a small electric motor with a torque reducing gear box, mounted near the steering wheels (4) as shown in FIG. 6, and the energy storage means is a rechargeable battery. The energy storage means (13), such as a common lead-acid battery, is mounted above the wheel axis or on an extended platform (53) as shown. For this embodiment, the motor means armature assembly (50) drives a drive chain or belt (51) to a larger gear or pulley (52) mounted on the drive wheel (4). A chain or belt guard is preferably placed over the chain or belt (51) to prevent accidental contact with the moving belt or chain and possibly injury. The armature assembly (50) is preferably equipped with a ratcheting drive gear assembly, such as is commonly found on the rear wheel axle of a bicycle. This ratcheting drive gear assembly allows the motor means to drive the steering wheels while the motor means is engaged, but does not cause the steering wheels to turn the motor armature when the motor means is not engaged (when the pallet truck is coasting).

In the alternate compressed-gas embodiment, shown in FIG. 1, the motor means (17) is mounted between the two front wheels, by suitable well-known means (54) such as carriage bolts, brackets or welding with a drive shaft (18) to transfer rotational energy from the motor means (17) and the tread of the steering wheels (4). For this embodiment, the motor means (17) is a rack and pinion actuator in the preferred embodiment, but could alternately be a piston with telescoping strut or an air motor. The energy storage means (13) is mounted above the pivot joint and the jack means (6) in order to allow the weight of the energy storage means (13) to rest along or near the vertical axis (8). The energy storage means (13) is a compressed gas tank, as shown in FIG. 1.

An output conduit (14), attached to the energy storage means output terminal (40), directs energy from the energy storage means (13) to a control means (19), mounted on the truck handle (11) such that the operator can easily control the motor means via energy throttling, as shown in FIGS. 1 and 6. In the preferred electro-mechanical embodiment, the output conduit (14) is a two-conductor electrical wire, and the control means (19) is a single-pole double-throw switch, as shown in FIG. 6. In the alternate compressed-gas embodiment, the output conduit (14) is a standard compressed gas hose, and the control means (19) is a one-input to two-output momentary gas valve as shown in FIG. 1.

A pair of motor conduits (16) delivers the switched energy from the control means (19) to the motor means (17) to enable forwards and backwards motor control. In the preferred electro-mechanical embodiment, the pair of motor conduits (16) are two electrical wires with a common reference or ground wire. In the alternate embodiment, the pair of motor conduits (16) are the same type of compressed gas hoses as the output conduits (14).

The control means (19) is mounted on or near the handle (11), which is located at the end of a towing bar (10). The towing bar (10) is pivotally mounted (12) to the steering wheel assembly to allow an operator to pull or push the truck.

Figure 2:
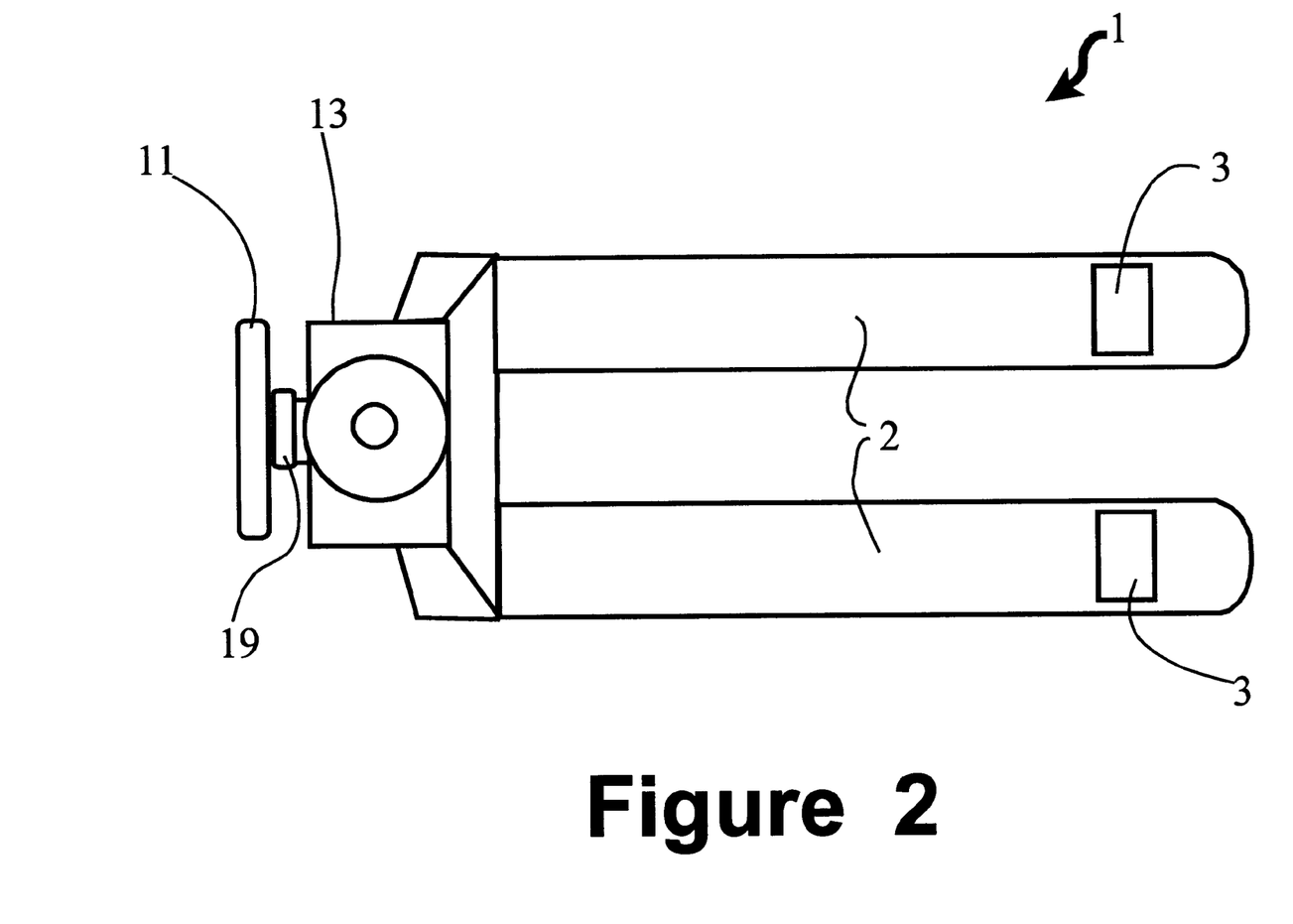
FIG. 2 shows a view from above the power-assisted pallet truck based on the compressed gas powered embodiment.
Figure 3:
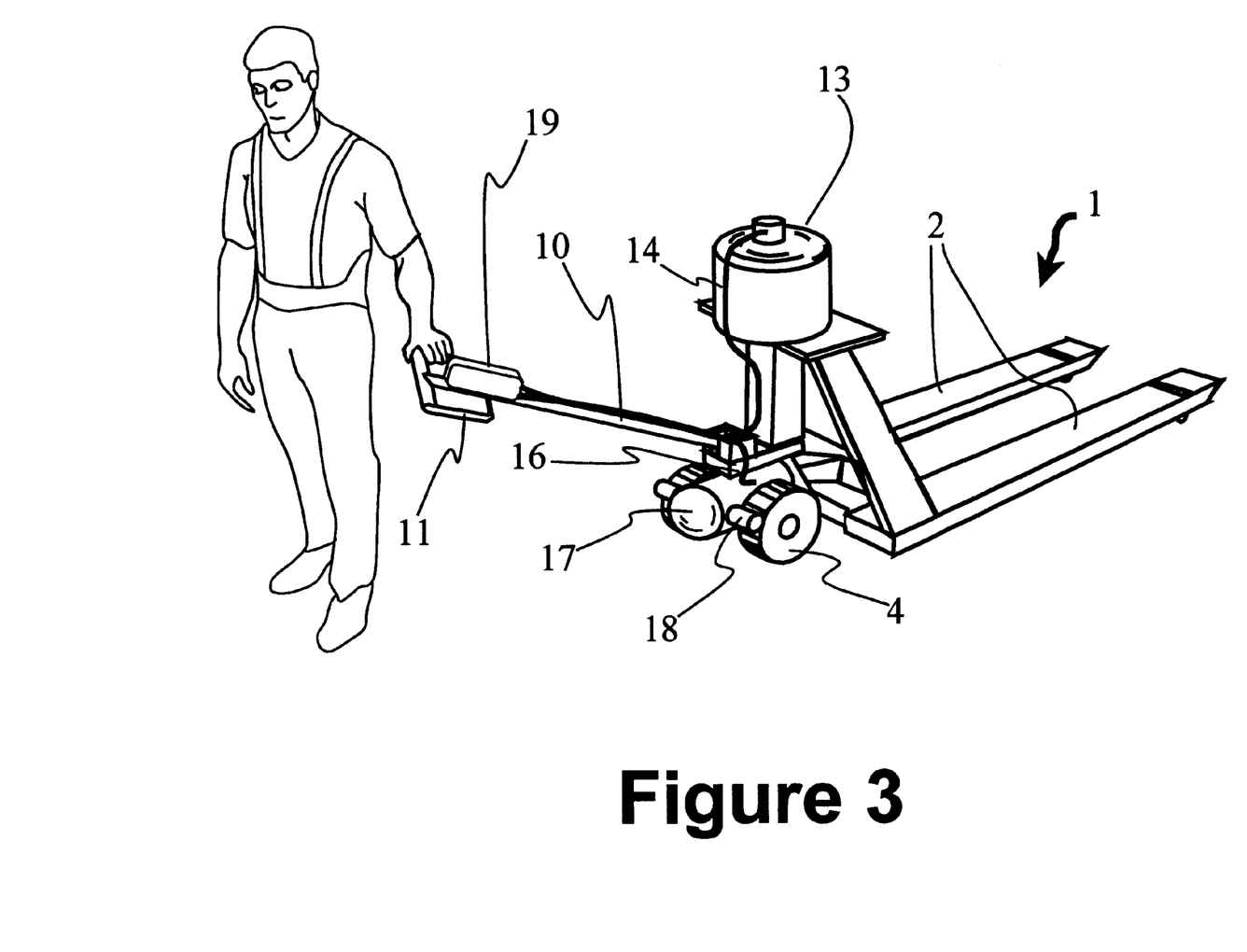
FIG. 3 shows a plan view of the invention in use by a single operator.

For further clarity and understanding of the invention, FIG. 2 shows a view of the compressed gas power-assisted pallet truck from above the truck, with the compressed gas tank (13), handle (11), lift fork tines (2), control means (19), and support wheels (3). FIG. 3 shows an operator pulling the power-assisted pallet truck behind him, using the control means (19) to selectively energize the motor means (17) to accelerate the load.

Figure 4:
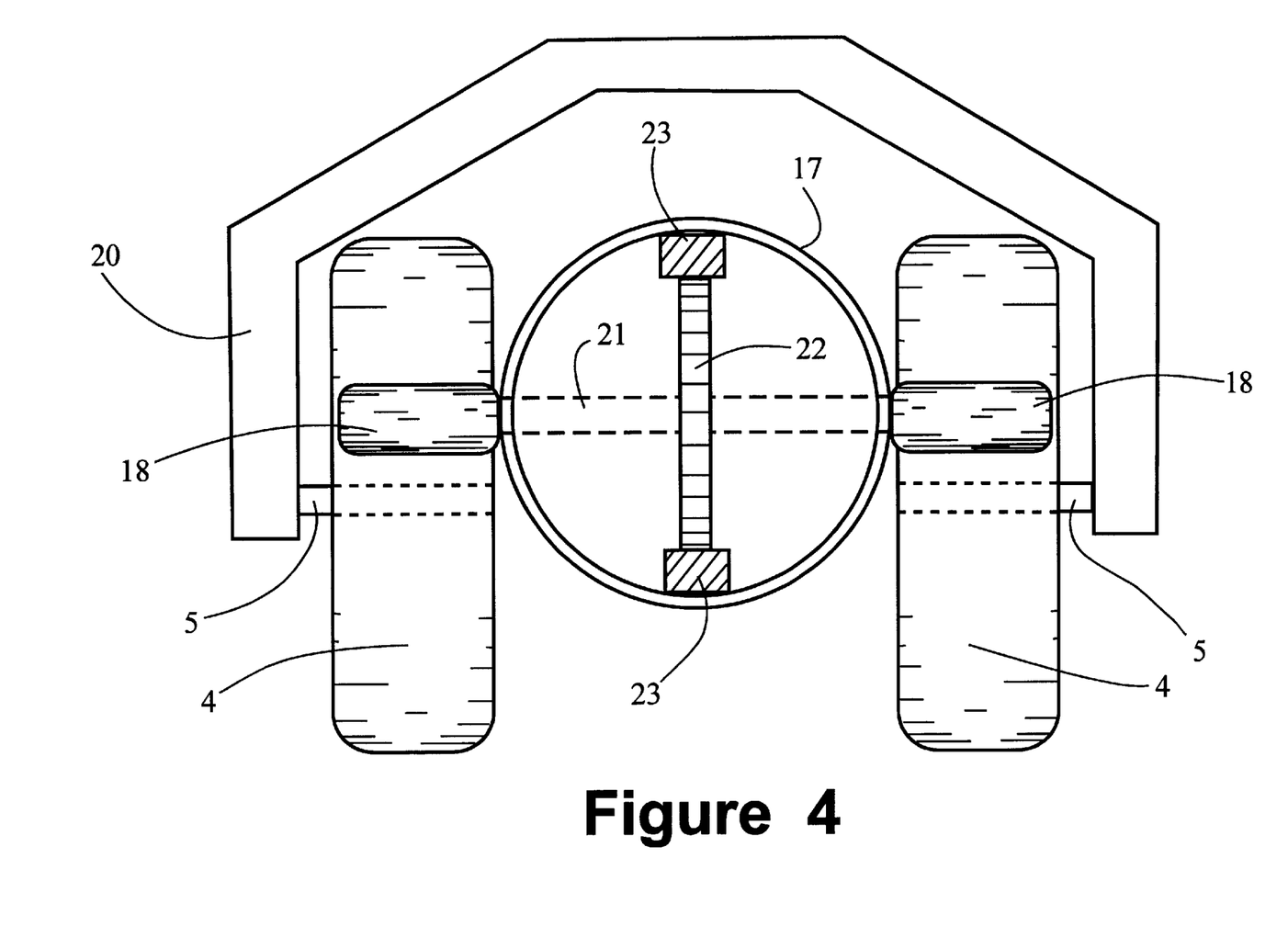

FIG. 4 presents a cut-away view of the steering wheel yoke assembly from the front of the truck for the alternate embodiment. The wheel yoke (20) spans the motor means (17) and the two steering wheels (4). The steering wheels (4) are supported by one or two axles (5). Rotational energy from the motor means (17) is transferred from the motor to the steering wheels (4) by a drive shaft (21) with friction rollers (18) which contact the treads of the steering wheels (4). In the alternate embodiment, the motor means (17) is a rack and pinion actuator, as shown in FIG. 4. The expansion of the pistons of the cylinder drives two racks (23), which cause the pinion gear (22) to rotate, thereby converting the energy due to the expansion or compression of the cylinder volume to rotational energy on the drive shaft (21).

Figure 5:
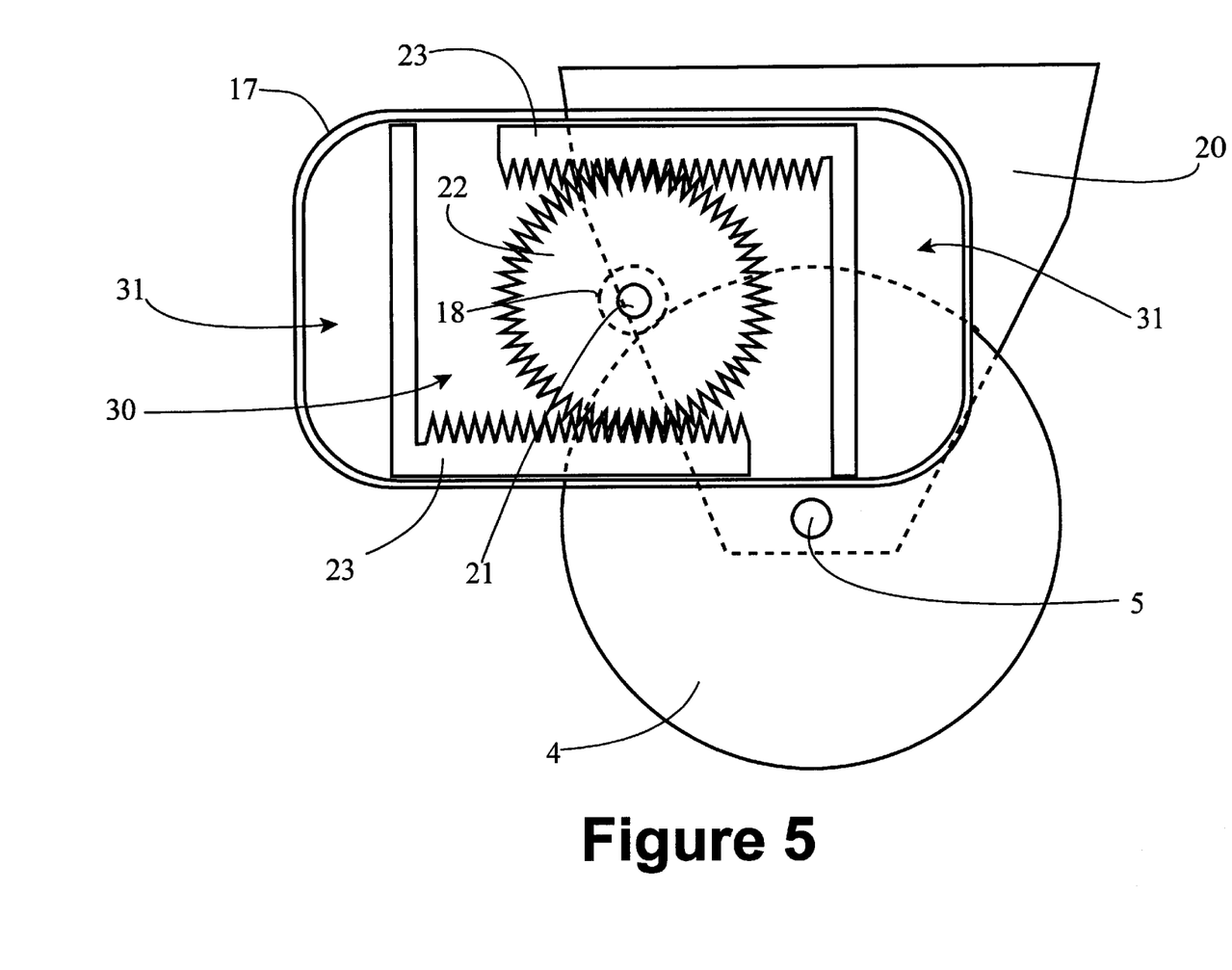
FIG. 5 is a side cut-away view of the actuator and steering wheel assembly.

FIG. 5 presents a cut-away view of the steering wheel yoke assembly from the side of the truck for the alternate embodiment. The rack and pinion actuator has upper and lower racks (23), which engage the pinion gear (22) to cause the drive shaft (21) to rotate and turn the steering wheels (4). In order to turn the wheels clockwise, compressed gas is injected into the outer cylinder cavities (31), which forces the cylinder heads towards each other and towards the drive shaft (21) (the drive shaft will rotate counter-clockwise). In order to turn the wheels counter-clockwise, compressed gas is injected into the inner cylinder cavity (30), which forces the cylinder heads away from each other, and away from the drive shaft. A ratchet or clutch mechanism is necessary between the drive shaft and the steering wheels to allow the wheels to coast when the pallet truck is being pulled by the operator without engaging the motor means.

Figure 7:
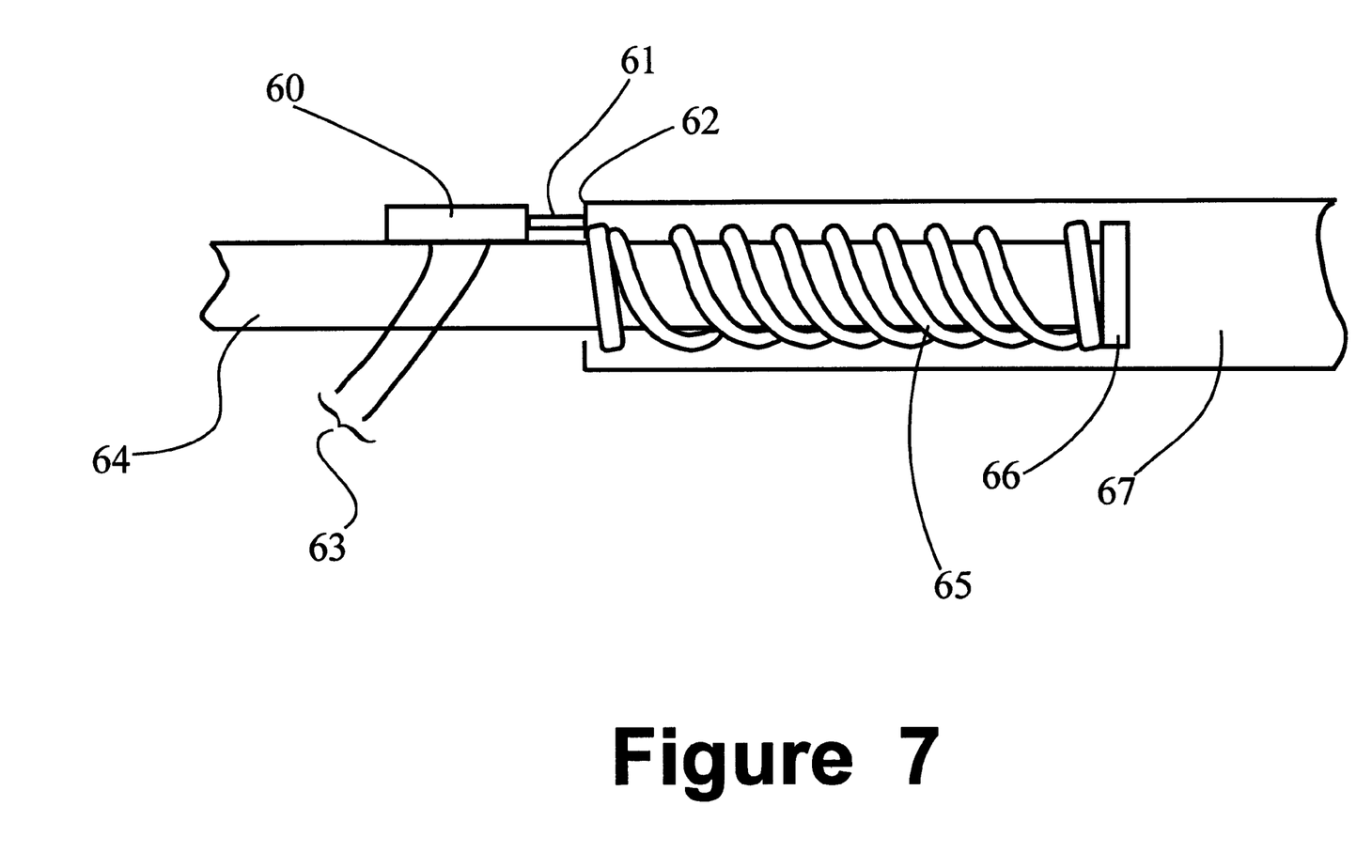
FIG. 7 sets forth a switch mounted on the towing bar which activates the electro-mechanical power assistance only during the initial tug by the operator to overcome the rest inertia of the load.

FIG. 7 shows a enhancement to the system which allows the electric motor to be engaged only during the initial tug by the operator to overcome the load's rest inertia. This device will prevent the operator from using the motor means full-time to drive the pallet truck, and protects the motor from possible damage. The tow bar (10) is divided into two sections, an upper section (64) and a lower section (67). The upper section (64) leads to the tow bar handle (11), and the lower section (67) leads to the tow bar pivot (12). The upper section is fabricated of slightly smaller diameter metal tubular stock than the lower section, such that the upper section can be slidably received into the hollow center of the lower section, as shown. The upper section is equipped with a spring stop (66), and the lower section is provided with a spring retention lip (62). Between the spring stop and the spring retention lip is disposed an expanding helical spring (65) which is slightly compressed in its normal state. The gauge of the spring (65) is selected such that the force necessary to compress it is approximately equal to the typical force necessary to initiate movement of the load from a state of rest, minus the force to be provided as assistance by the motor means. For most applications, this compression force will be approximately 30 pounds of pressure. A small electrical switch (60) is mounted to the upper section (64) such that the switch's actuator (61) contacts the spring retention lip (62) and is depressed by the force of the spring (65) when the assembly is in its normal state. The switch (60) is a normally closed type of switch, such that the electrical connection between the input and output wires (63) is broken, or open, when the actuator (61) is depressed. The switch (60) is placed in electrical series with the battery and the motor such that when the handle is in its normal state (load is at rest), the switch breaks the electrical circuit and the motor means cannot be engaged. When an operator tugs on the handle of tow bar and applies a pulling force equal to or greater than the compression force of the spring (65), the spring is compressed, the switch (60) travels with the upper section (64) away from the lower section (67), and the armature (61) is released to its normally closed position. This closes the switch contacts between the input and output wires (63), and completes the electrical circuit between the battery and the motor if the operator has also operated the control switch on the handle. Because the circuit is complete, the motor will engage and assist the operator in getting the load moving, but as the load reaches walking speed, the force applied by the operator to the handle to maintain the load at walking speed will decrease, and the expansion pressure of the spring (65) will force the switch (60) to an open circuit state again. As long as the force supplied by the operator on the handle is less than the compression force of the spring, such as less than 30 pounds, the motor will be disengaged. In a typical application, 30 pounds of force or less is all that is required to maintain a load at walking speed, so the motor is disabled from being used as a full-time source of drive power for the loaded pallet truck.

While the disclosure contained herein has set forth a preferred embodiment of the invention and an alternative embodiment, it will be appreciated by those skilled in the art that many minor variations to the embodiment can be made without departing from the scope and spirit of the invention.

What is claimed is:

1. A power-assisted pallet truck for transporting loaded pallets over flat surfaces under the primary power of a single operator, said pallet truck comprising:

one or more load bed forks for lifting and carrying a loaded pallet;

a steering yoke pivotally mounted to said load bed forks, said steering yoke providing mechanical support to one or more steering wheels which contact the surface;

a tow bar attached to said steering yoke, said tow bar being equipped with an operator handle, and said tow bar being mechanically attached to said steering yoke such that an operator can pull and steer the pallet truck using the operator handle;

an energy storage means having an energy output connector, said energy storage means being mounted to said pallet truck such that it travels with the pallet truck;

a motor means for imparting rotational energy to said steering wheels when engaged, said motor means having motor input connector and a mechanical rotational energy output;

a motor control means adapted to selectively and momentarily engage said motor means by conduction of energy from said energy storage means to said motor means responsive to operator-induced acceleration of the pallet truck, further adapted to automatically disengage said motor means responsive to relatively steady velocity of the pallet truck by interruption of energy from said energy storage means to said motor means, said motor control means having a control input connector and a control output connector;

a first energy conduit for communicating energy from said energy storage means output connector to said motor control input connector;

a second energy conduit for communicating energy from said motor control output connector to said motor input connector; and a transmission means suitably disposed between said motor means mechanical rotational energy output and said steering wheels such that when the operator momentarily applies force to said operator handle sufficient to accelerate the pallet truck, energy is conducted from the energy storage means to the motor means such that the motor means momentarily drives the steering wheels to assist the operator during acceleration of the loaded pallet, and such that the motor means is disengaged automatically by said motor control means when the pallet truck attains a stable velocity.

2. The power-assisted pallet truck of claim 1 wherein said energy storage means comprises an electric battery, said first and second energy conduits comprise electrical conductors, said motor control means comprises an acceleration-activated momentary electric switch, and said motor means comprises an electric motor.

3. The power-assisted pallet truck of claim 1 wherein said energy storage means is a compressed gas tank, said first and second energy conduits are compressed gas hoses, and said operator control means is a momentary gas valve.

4. The power-assisted pallet truck of claim 3 wherein said motor means is an air motor.

5. The power-assisted pallet truck of claim 3 wherein said motor means is a telescoping strut.

6. The power-assisted pallet truck of claim 3 wherein said motor means is a rack-and-pinion actuator.

7. The power-assisted pallet truck of claim 1 wherein said transmission means further comprises an output gear mounted on said motor means rotational energy output;

a steering wheel gear mounted on said steering wheels; and a chain drive means for communicating rotational force from said output gear to said steering wheel gear.

8. The power-assisted pallet truck of claim 7 wherein said output gear further comprises a ratcheting means for allowing coasting of said output gear with respect to said motor means rotational energy output in one direction of rotation.

9. The power-assisted pallet truck of claim 1 wherein said transmission means further comprises an output pulley mounted on said motor means rotational energy output;

a steering wheel pulley mounted on said steering wheels; and a belt drive means for communicating rotational force from said output pulley to said steering wheel pulley.

10. The power-assisted pallet truck of claim 9 wherein said output pulley further comprises a ratcheting means for allowing coasting of said output pulley with respect to said motor means rotational energy output in one direction of rotation.

11. The power-assisted pallet truck of claim 1 wherein:

said tow bar further comprises an upper and a lower section, said upper section being attached to said operator handle, said lower section being attached to said steering yoke, with a spring-loaded limited-range slidable mechanical interconnect between said upper section and said lower section; and said motor control means further comprises a governor momentary switch which is operated momentarily during the compression of the slidable interconnect of the tow bar such that during a transition from rest to stable velocity of the loaded pallet, force applied to the operator handle by the operator to accelerate the load compresses the slidable interconnect and allows the motor means to be engaged, and such that as the loaded pallet reaches a stable speed, the spring-loaded slidable interconnect returns to its normal position and the governor switch disengages the motor means.

12. The power-assisted pallet truck of claim 11 wherein said governor switch comprises a momentary electrical switch.

13. The power-assisted pallet truck of claim 12 wherein said governor switch comprises a momentary gas valve assembly.

* * * * *